Sept. 2, 1958  V. E. SPROUSE  2,850,262
ROTARY ENGINE
Filed Aug. 29, 1956  15 Sheets-Sheet 5
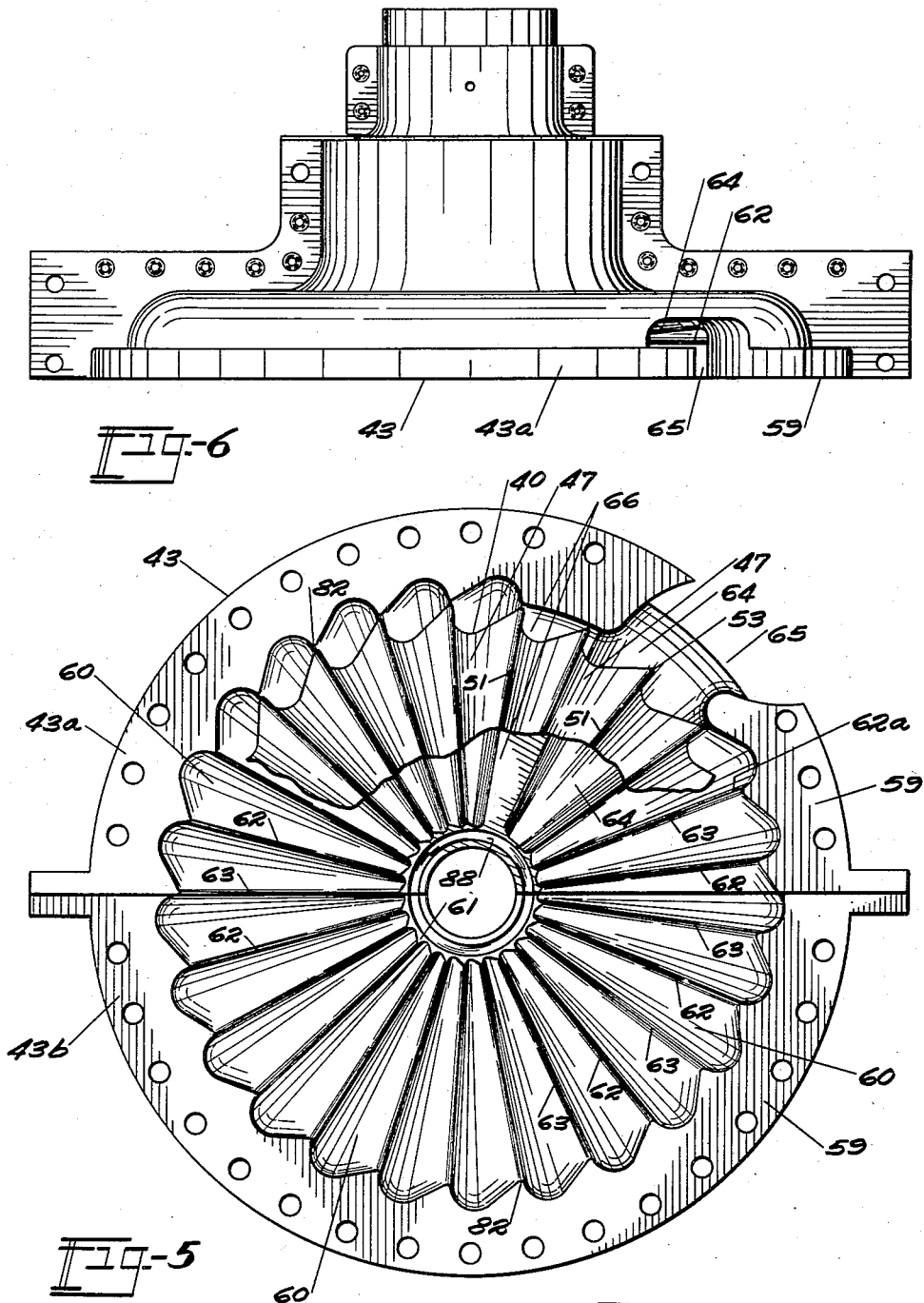
INVENTOR:-
VERNER E. SPROUSE
By Herbert A. Minturn
ATTORNEY Sept. 2, 1958 V. E. SPROUSE 2,850,262
ROTARY ENGINE
Filed Aug. 29, 1956 15 Sheets-Sheet 6
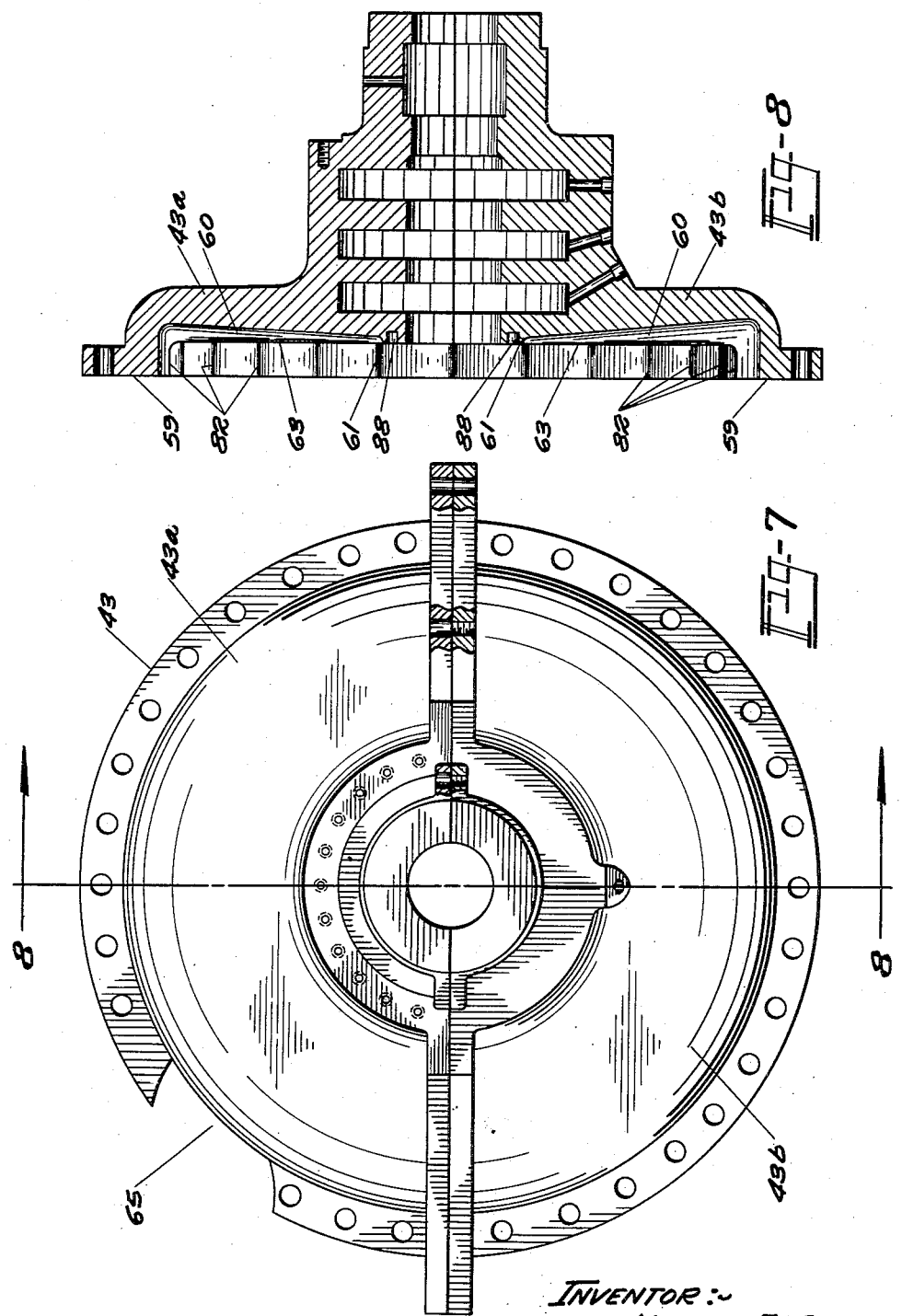
INVENTOR:-
VERNER E. SPROUSE
By Herbert A. Minturn
ATTORNEY

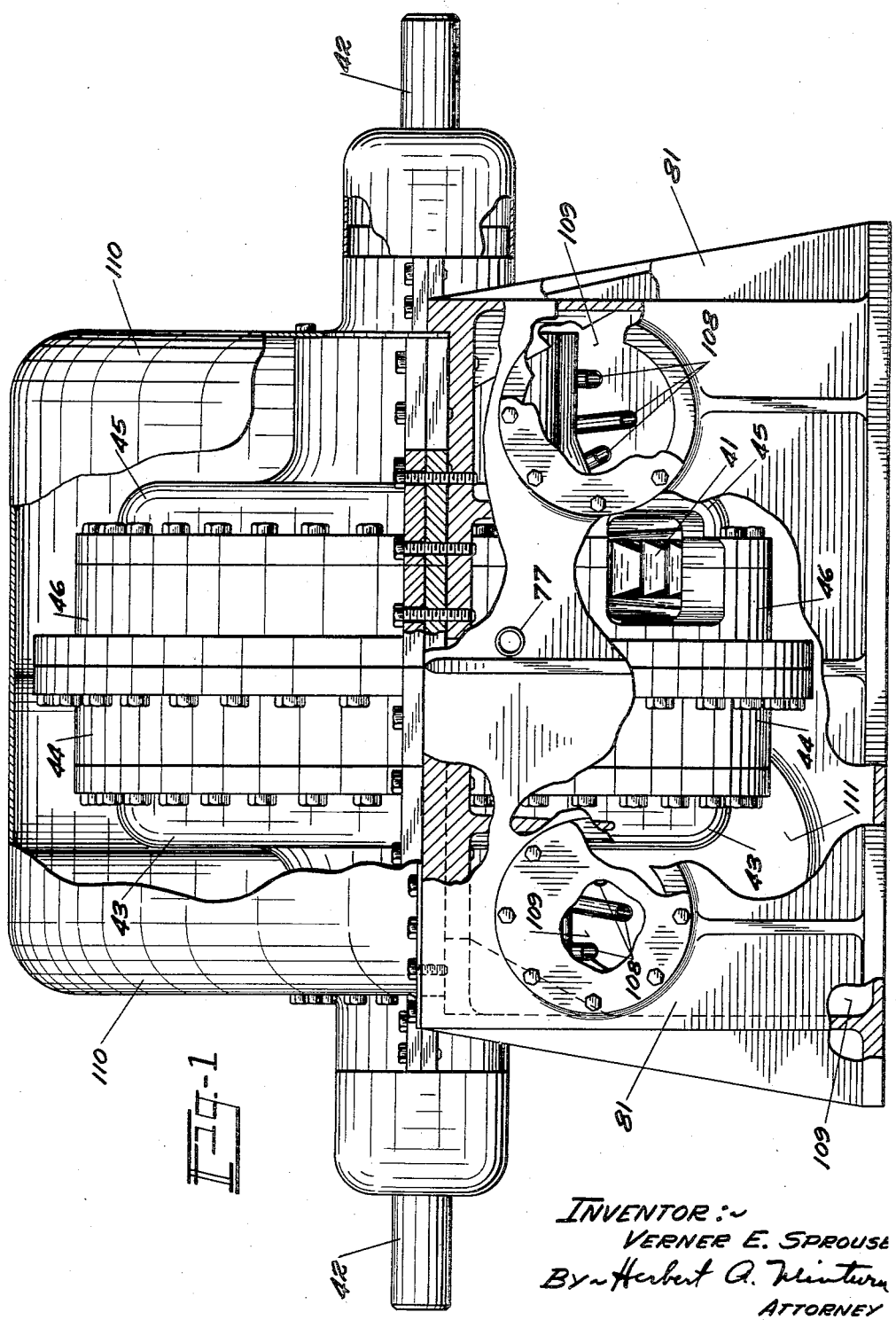

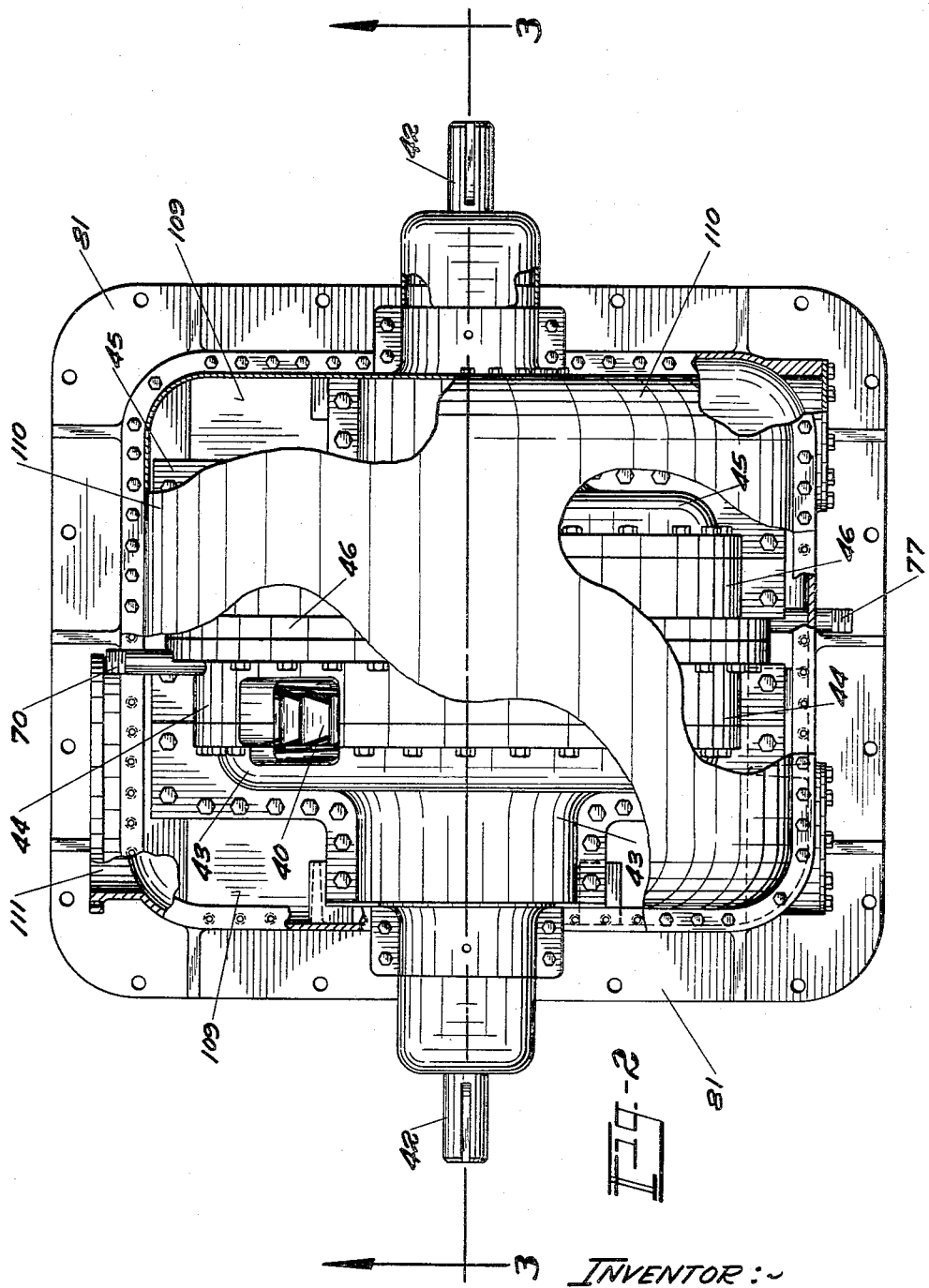

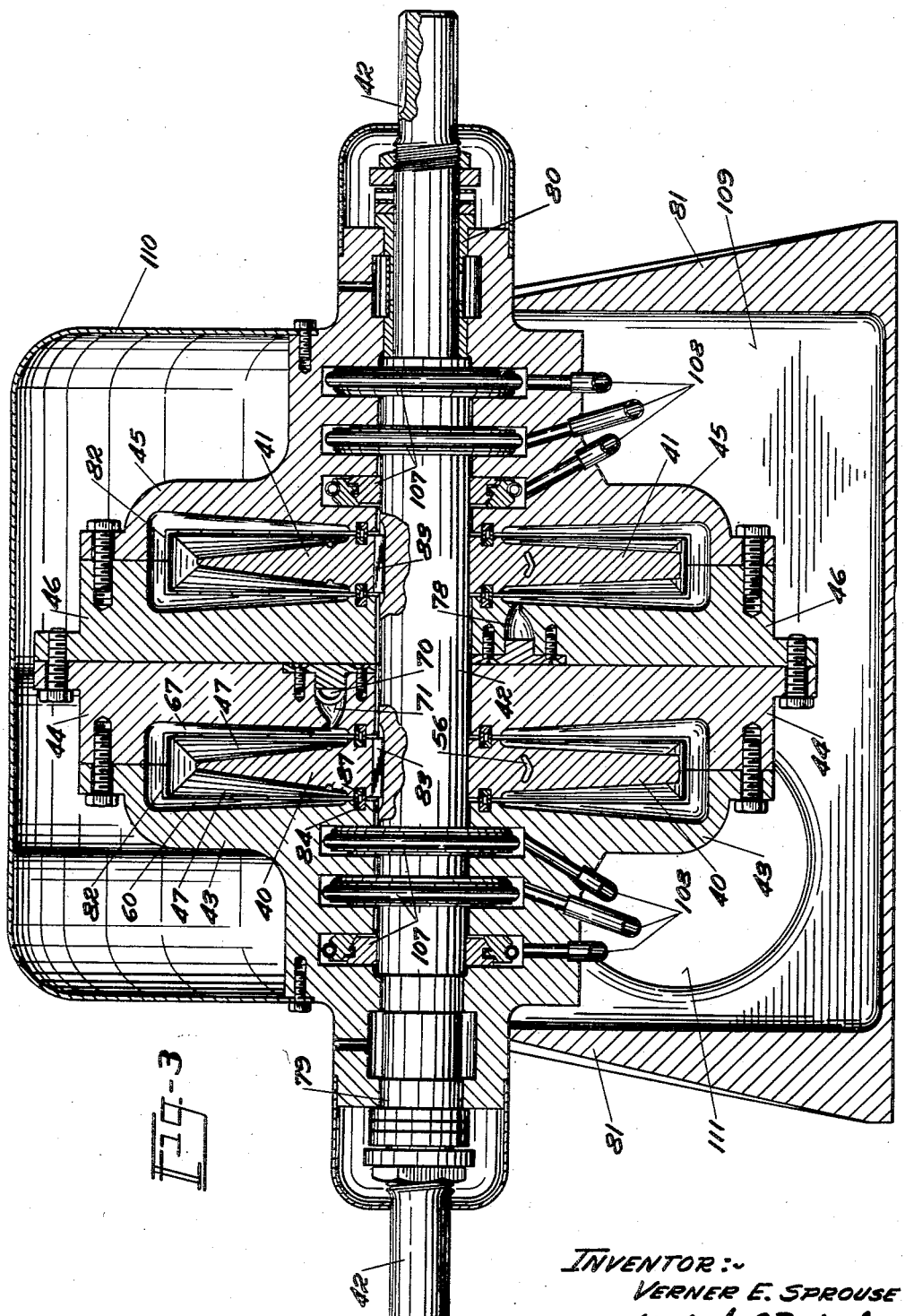

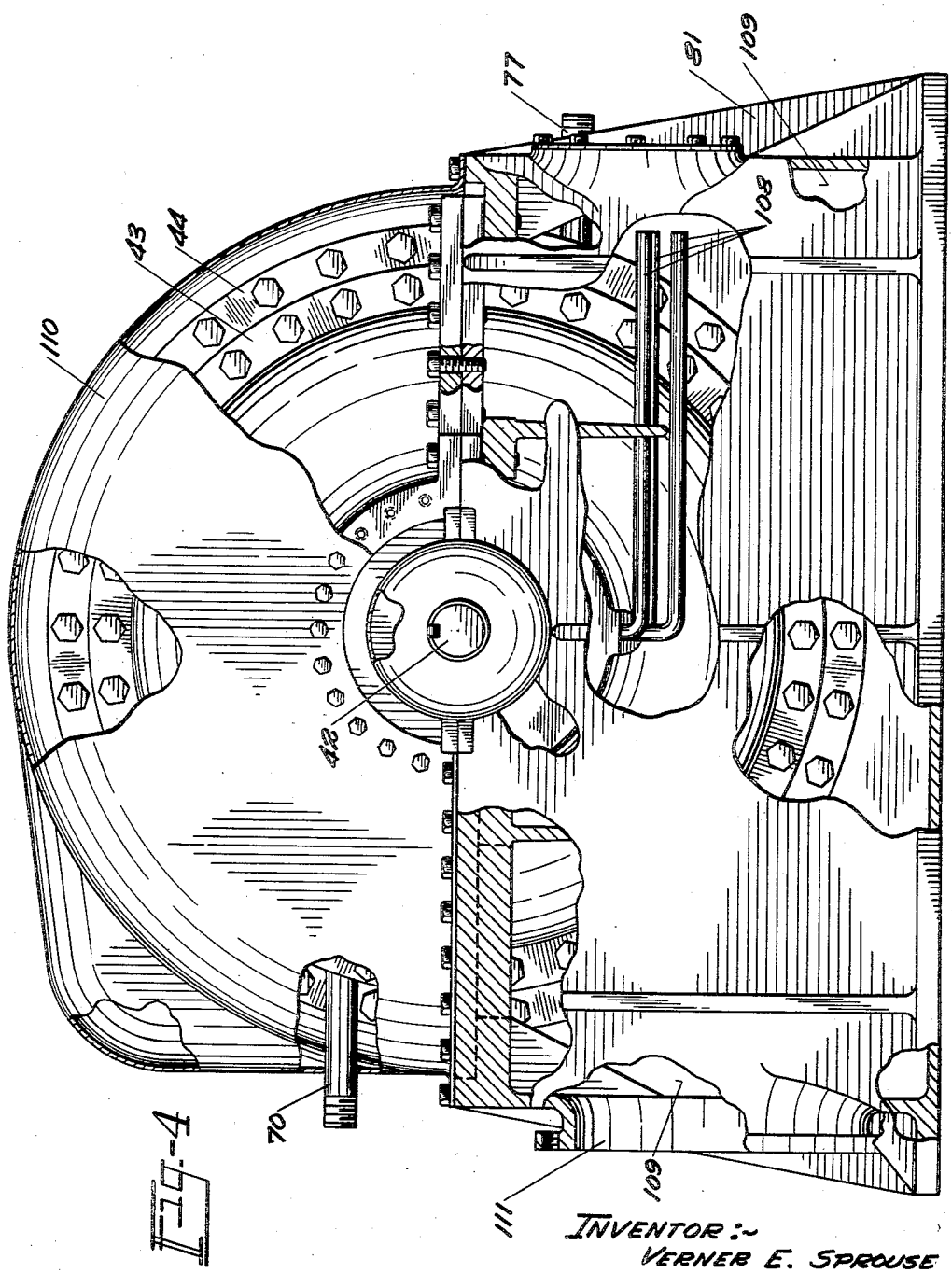

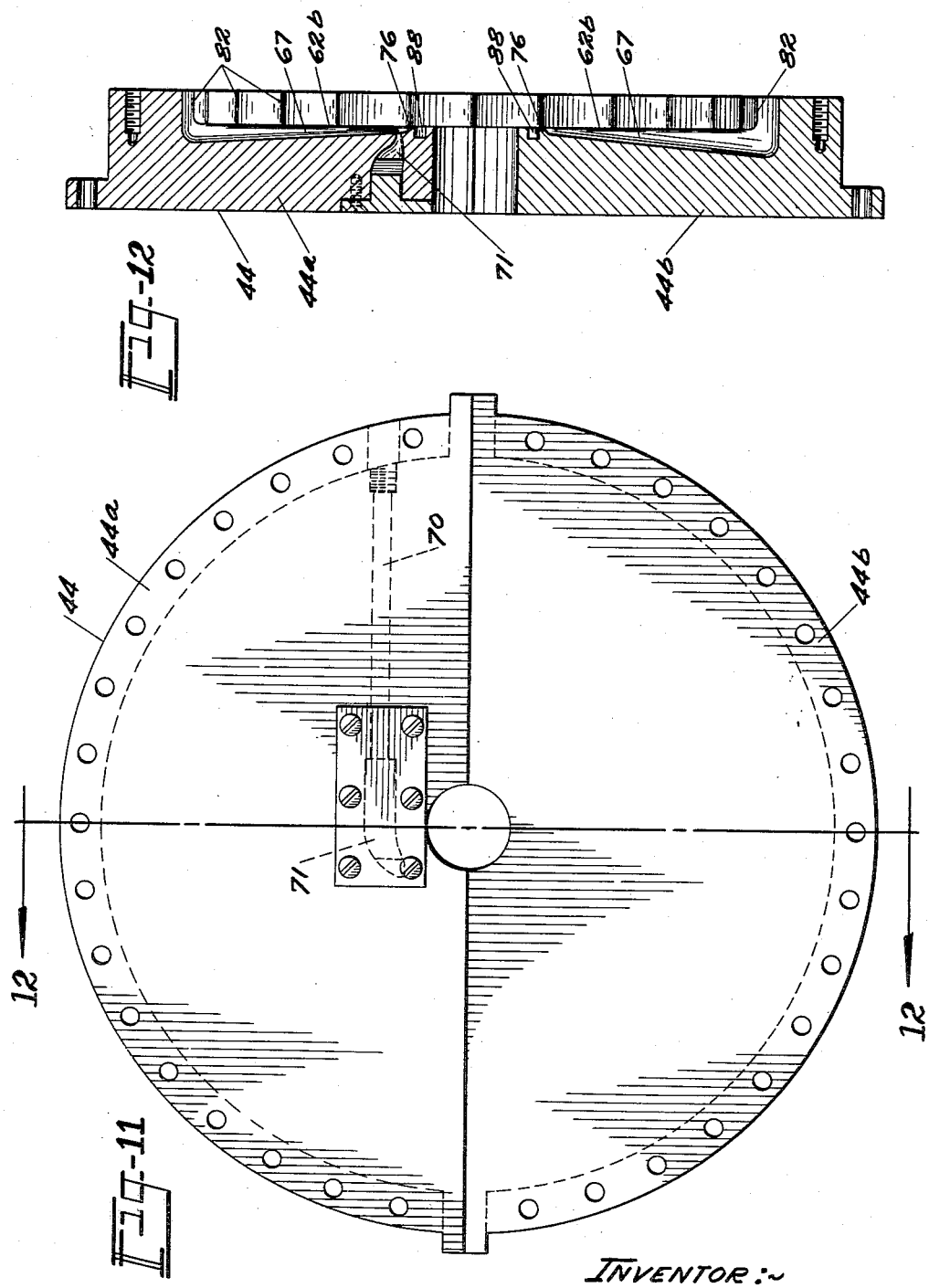

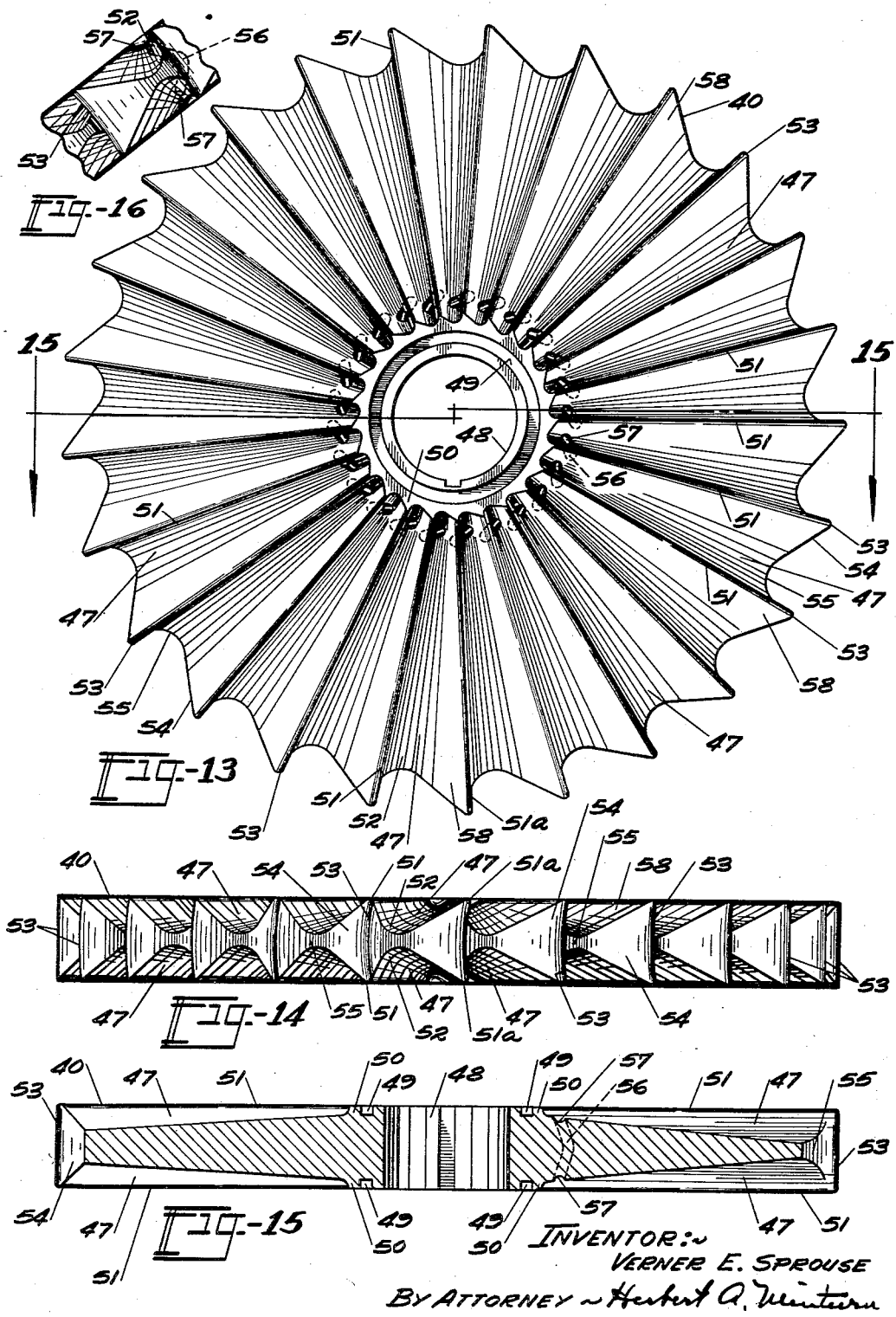

Sept. 2, 1958 V. E. SPROUSE 2,850,262
ROTARY ENGINE
Filed Aug. 29, 1956 15 Sheets-Sheet 10
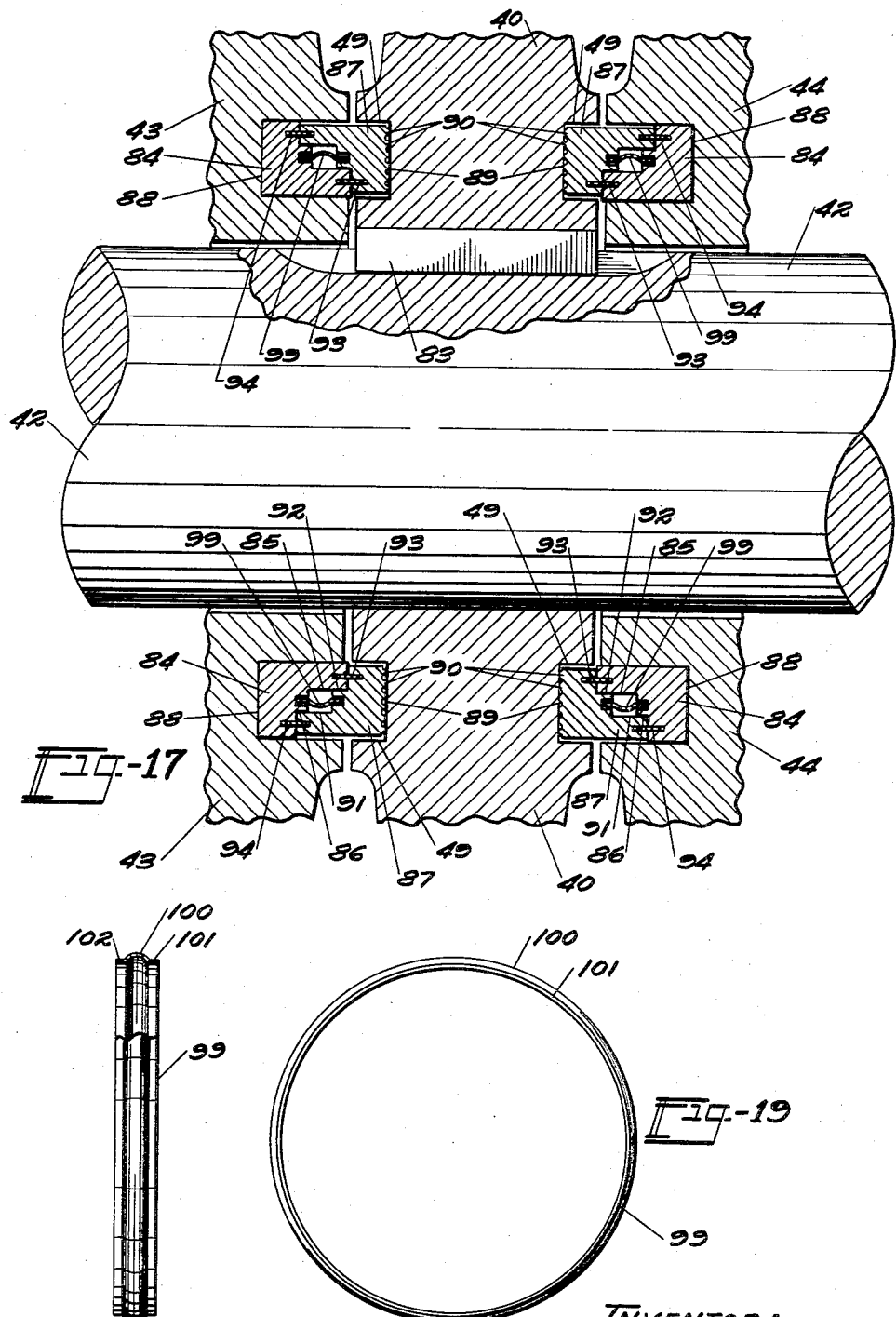
INVENTOR:~
VERNER E. SPROUSE
BY ATTORNEY ~ Herbert A. Minturn Sept. 2, 1958  V. E. SPROUSE  2,850,262
ROTARY ENGINE
Filed Aug. 29, 1956  15 Sheets-Sheet 11
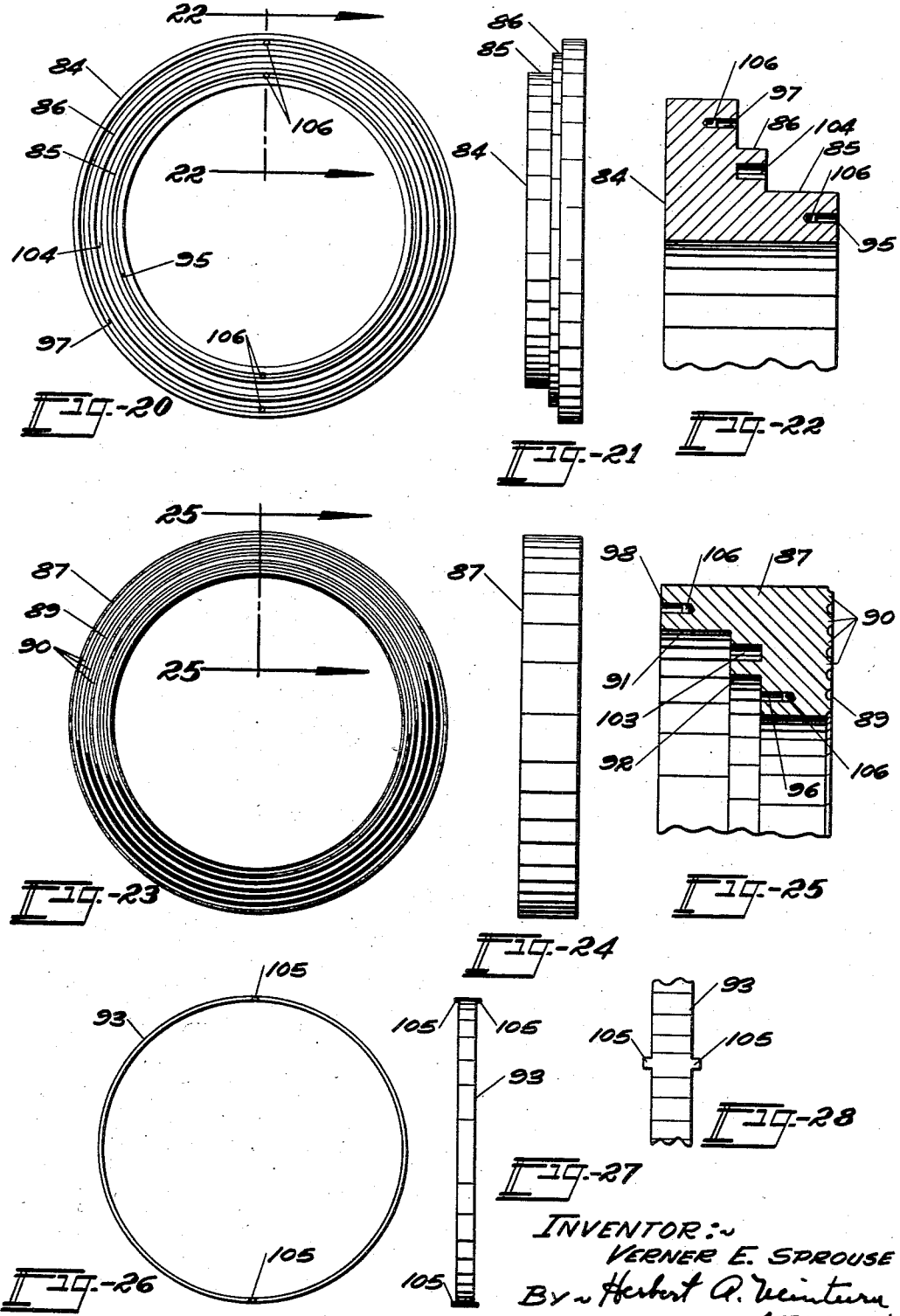
INVENTOR:~
VERNER E. SPROUSE
By ~ Herbert A. Weinturn
ATTORNEY

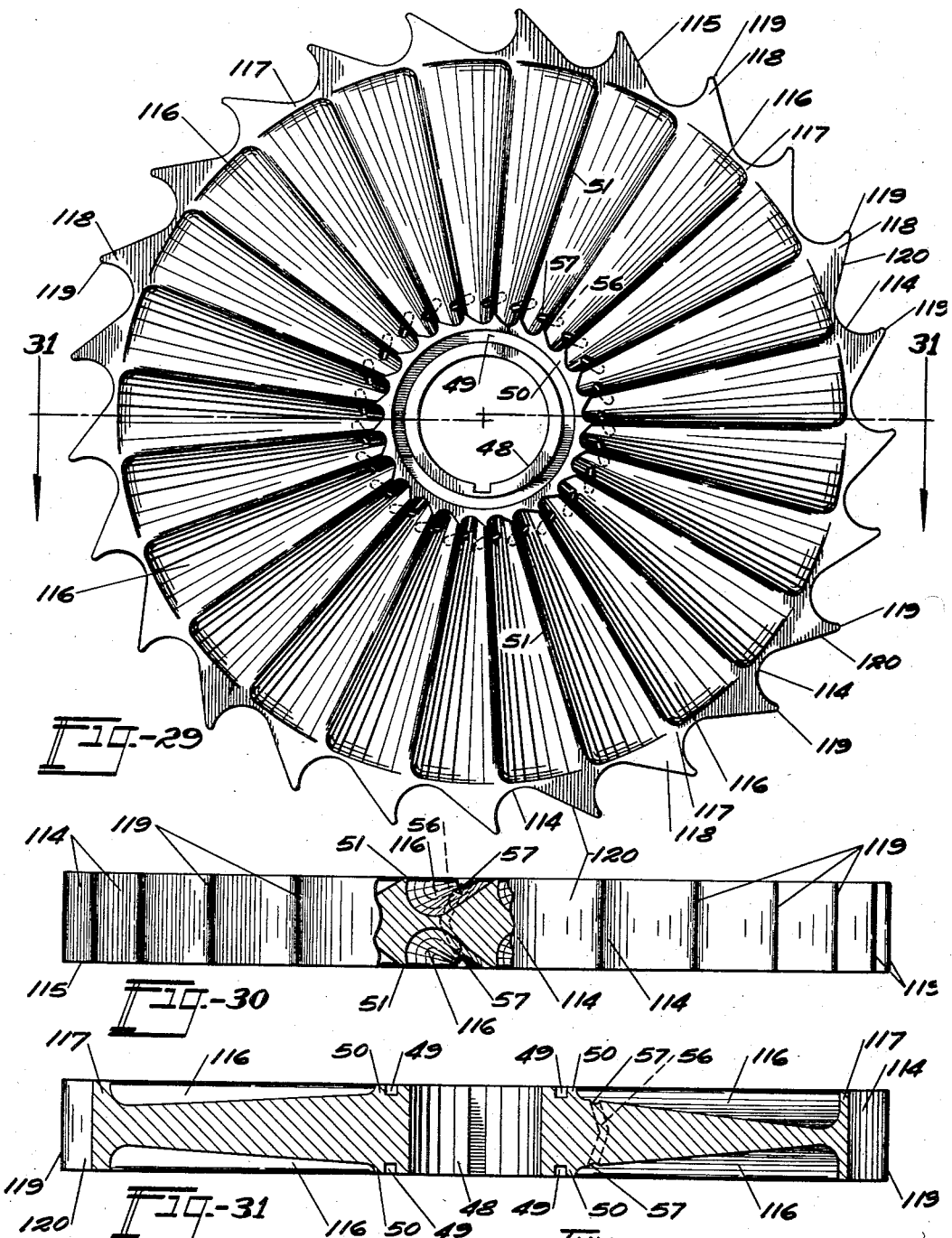

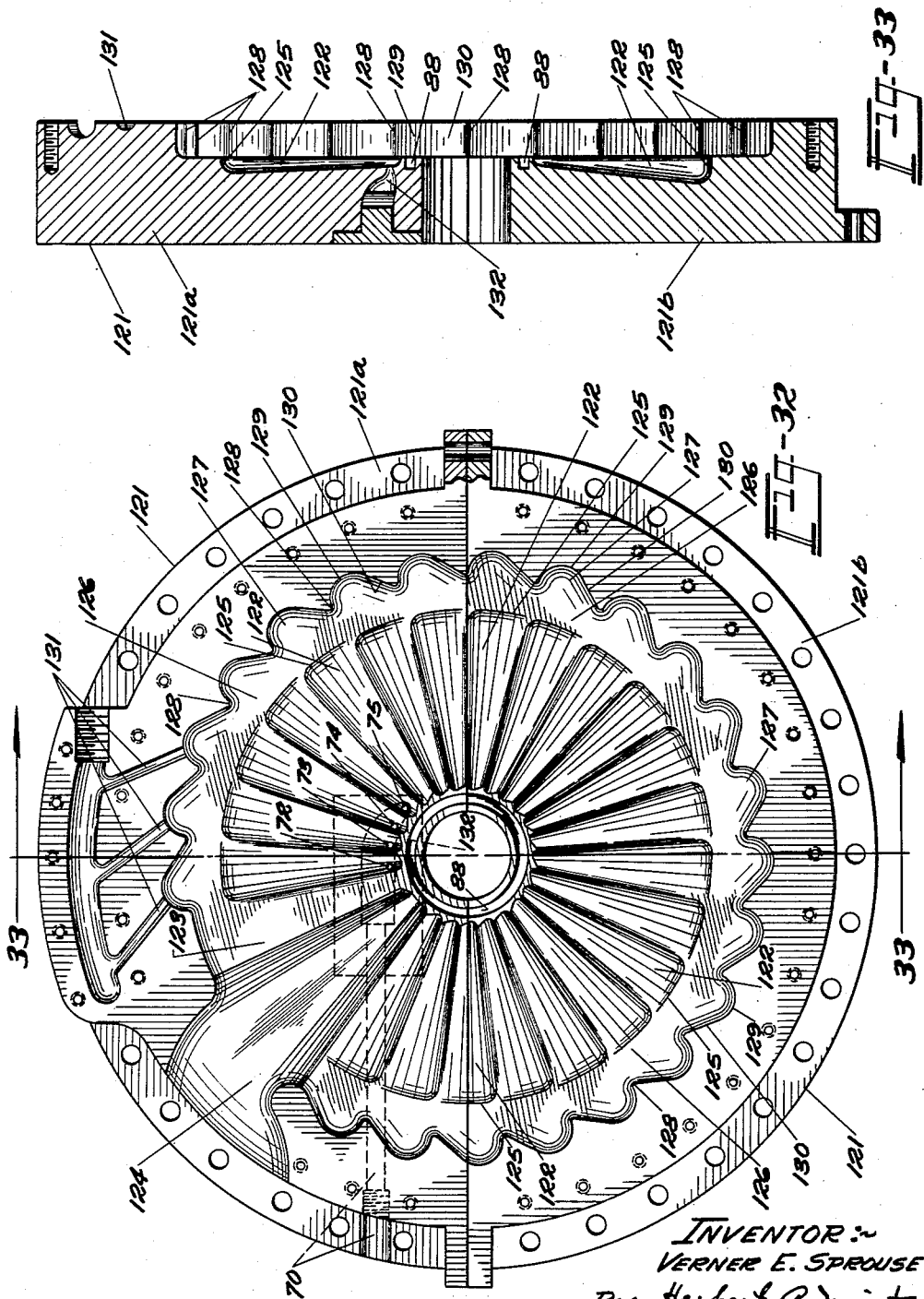

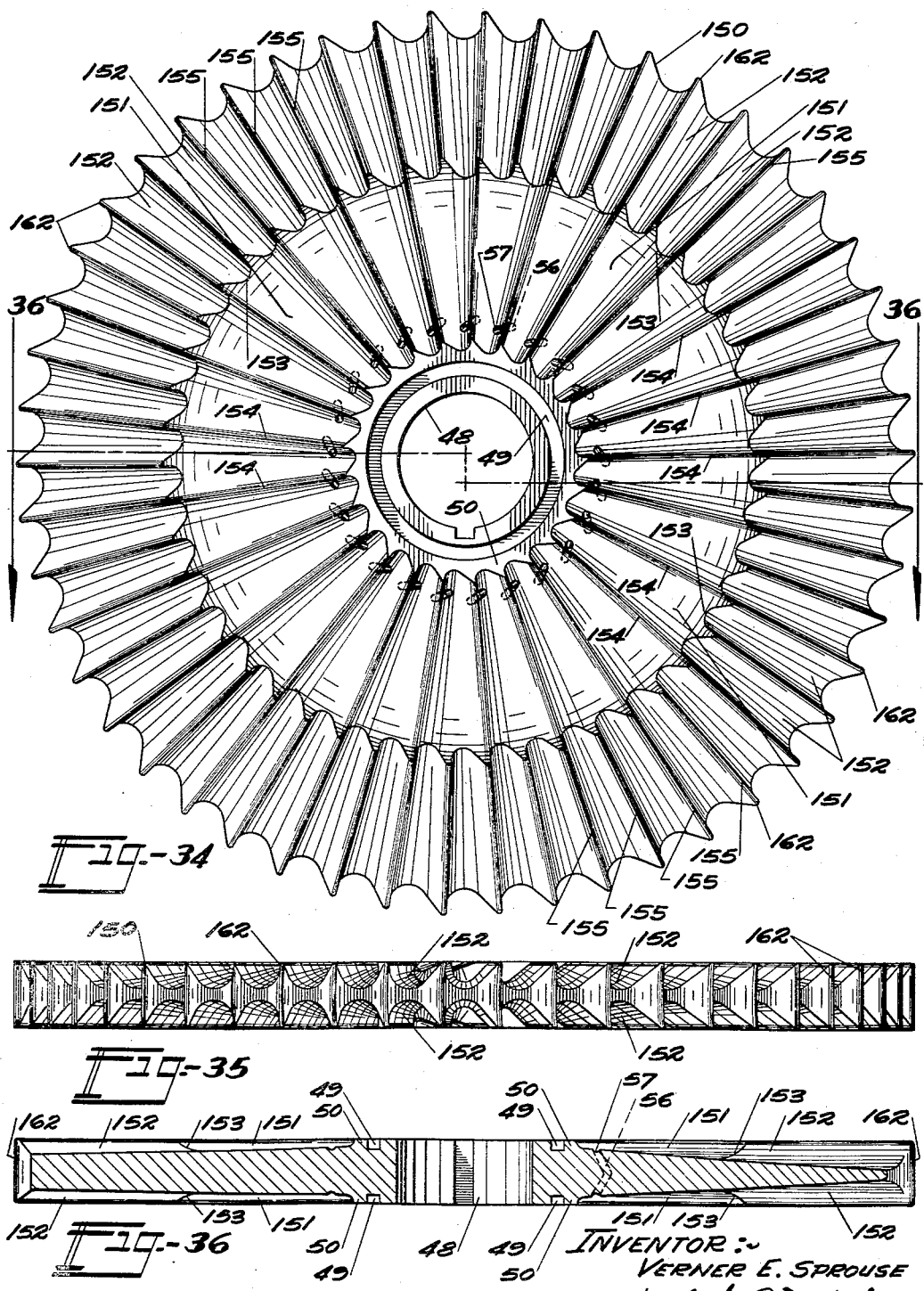

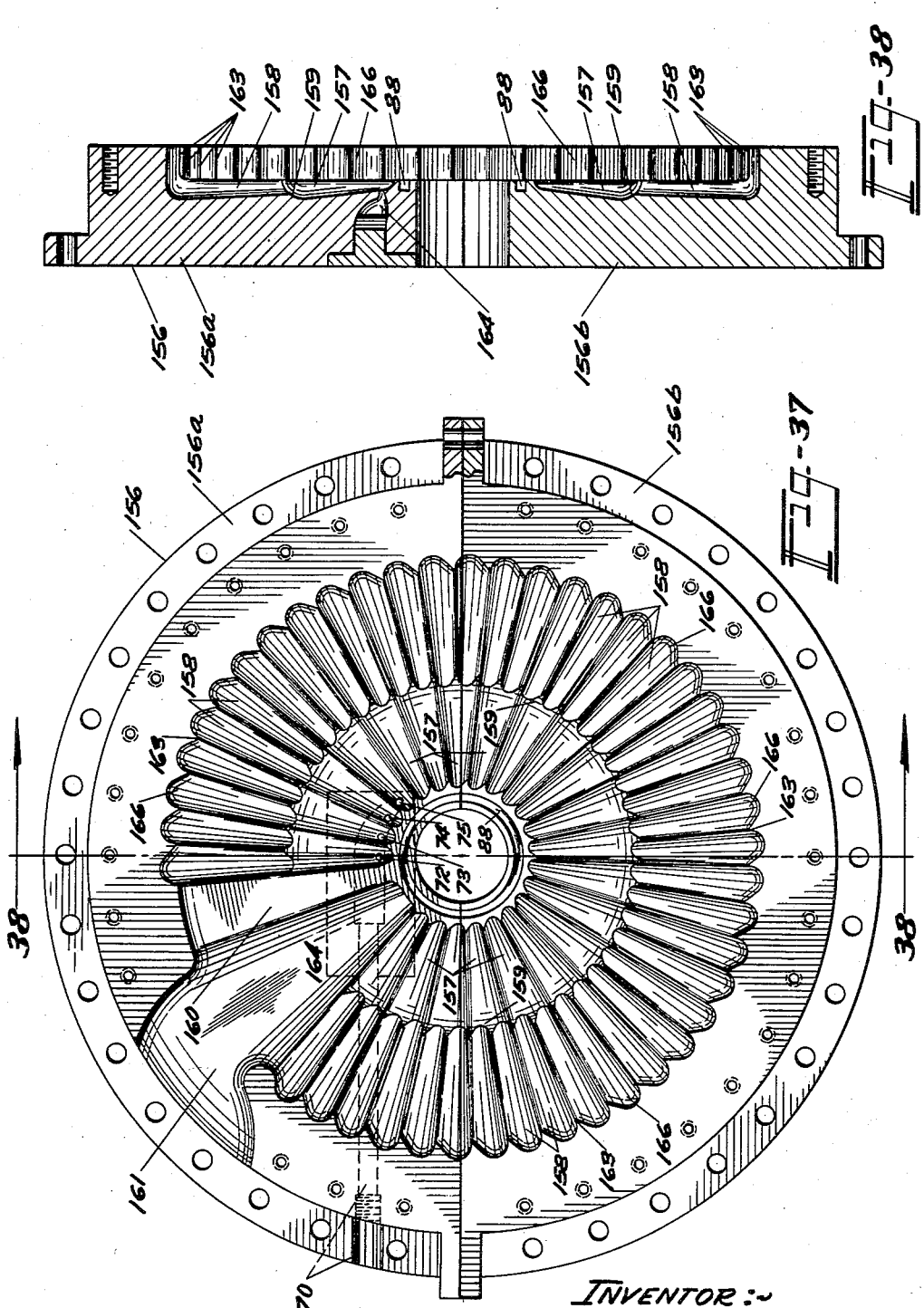

United States Patent Office 2,850,262
Patented Sept. 2, 1958

2,850,262
ROTARY ENGINE
Verner E. Sprouse, Columbus, Ind., assignor to Vernco Corporation, Columbus, Ind., a corporation of Indiana
Application August 29, 1956, Serial No. 606,858
8 Claims. (Cl. 253—86)

This invention relates to a rotary type engine wherein a gaseous fluid is employed to drive one or more rotors. The engine may be made in various sizes by increasing the number of rotors from one to any number desired for the required output, and further the output of the engine may be varied by decreasing or increasing the diameter, number of blades defining cells, and the width of the rotor.

The rotary type engine herein shown and described and constituting the invention is designed to have the fluid flow radially from the axis of rotation of the rotor, supplemented when increased power is desired by tangential flow of fluid at the periphery of the rotor.

The rotor is characterized by having a plurality of radially extending cells along its side face in each instance, increasing from a relatively small cross section adjacent the axis to a greater cross section at the periphery. Likewise the stator within which the rotor is to turn is provided with a number of like cells.

The invention permits a construction wherein the rotor and also the stator may be formed by casting operations rather than having to insert buckets or blading, thereby materially reducing the over-all cost of the engine, as well as promoting a much longer life under high pressures and high temperatures.

Of course the primary object of the invention is to obtain the maximum power output from the minimum sized unit at relatively high efficiency. In respect to the gaseous fluid, by this term there is meant to be included steam, air, and products of combustion of substances externally of the rotor and stator, in fact any gaseous medium which is compressible and expansible.

A further important advantage of the invention is that there is no end thrust on the rotor driven shaft so that thrust friction is avoided. This is due to the fact that the operating pressures are equalized on both sides of the rotor automatically.

These and many other important objects and advantages of the invention will become more apparent to those versed in the art in the following description of the invention as illustrated in the accompanying drawings in which Fig. 1 is a view in side elevation and partial section of an engine embodying the invention;

Fig. 2 is a view in top plan and partial section of the engine;

Fig. 3 is a view in vertical section on the line 3—3 in Fig. 2;

Fig. 4 is a view in end elevation and partial section of the engine;

Fig. 5 is a view in inside elevation of one side of a stator case;

Fig. 6 is a view in top plan of the stator case half;

Fig. 7 is a view in end elevation of the outside of the stator case, in partial section;

Fig. 8 is a view in vertical section on the line 8—8 in Fig. 7;

Fig. 11 is a view in outside elevation of the stator case portion shown in Fig. 9;

Fig. 12 is a view in vertical section on the line 12—12 in Fig. 11;

Fig. 13 is a view in side elevation of a rotor on an enlarged scale;

Fig. 14 is a view in elevation of the peripheral side of the rotor;

Fig. 15 is a view in section on the line 15—15 in Fig. 13;

Fig. 16 is a detail of a fluid flow line between opposite sides of the rotor;

Fig. 17 is a view in detail on an enlarged scale and in vertical section illustrating radial seals between the rotor and the stator case sides;

Fig. 18 is a view in end elevation and partial section of a compression ring employed in the sealing means;

Fig. 19 is a view in side elevation of the ring;

Fig. 20 is a view in side elevation of a shaft packing ring;

Fig. 21 is a view in end elevation of the ring;

Fig. 22 is a view in section on an enlarged scale on the line 22—22 in Fig. 20;

Fig. 23 is a view in side elevation of a packing ring used as a companion to the ring shown in Fig. 20;

Fig. 24 is a view in side elevation of the ring shown in Fig. 23;

Fig. 25 is a view on an enlarged scale in section on the line 25—25 in Fig. 23;

Fig. 26 is a view in side elevation of a packing retaining ring;

Fig. 27 is a view in end elevation of the retaining ring;

Fig. 28 is a detail in side elevation on an enlarged scale of a length of the retaining ring;

Fig. 29 is a view in side elevation of a modified form of rotor;

Fig. 30 is a view in front elevation and partial section of the modified rotor;

Fig. 31 is a view in section on the line 31—31 in Fig. 29;

Fig. 32 is a view in inside elevation and partial section of a modified form of a stator case operable with the rotor of Fig. 29;

Fig. 33 is a view in section on the line 33—33 in Fig. 32;

Fig. 34 is a view in side elevation of a still further modified form of a rotor;

Fig. 35 is a view in edge elevation of the rotor shown in Fig. 34;

Fig. 36 is a view in section on the line 36—36 in Fig. 34;

Fig. 37 is a view in inside elevation of one half of a stator case used in conjunction with the rotor shown in Fig. 34; and Fig. 38 is a view in section on the line 38—38 in Fig. 37.

Figure 10:
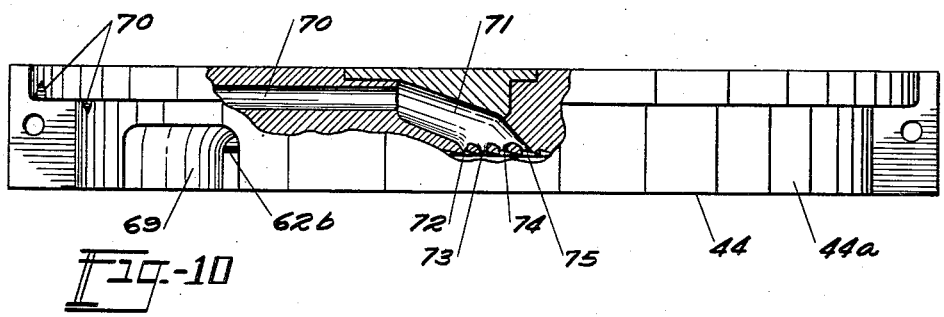
Fig. 10 is a view in top plan and partial section of the portion of the stator case shown in Fig. 9.

In the form of the invention first about to be described I employ two identical rotors 40 and 41, each fixed to a drive shaft 42. The rotor 40 turns between the two stationary interconnected stator case members 43 and 44 secured one to the other, and the rotor 41 turns between the two stationary stator case members 45 and 46 secured one to the other, the two members 44 and 46 being secured to each other so that all of the stator members are fixed into position relative to the rotors 40 and 41 and the shaft 42.

Each of the rotors 40 and 41 is identical in shape and size, and a description of the rotor 40 will therefore be sufficient to describe both. Referring to Figs. 13–16, each side of the rotor is identically formed to have a plurality of cells 47 therearound. Each cell 47 extends radially outwardly from a central circumferential zone, widening as it proceeds to the peripheral portion of the rotor. Specifically, the rotor 40 is provided with a central bore 48 therethrough to receive the shaft 42, and spaced radially from the bore 48 is a sealing gland groove 49. An annular rib 50 is disposed radially outwardly and circumferentially around the groove 49. From this rib 50, there extend radial ribs 51 all terminating in a plane in common with the circumferential rib 50.

Between adjacent ribs 51 and 51a for example, Fig. 13, the cell has the conformation of a straight substantially planar area 58 extending diagonally inwardly of the rotor from the rib 51a from which inner portion the cell wall curves around through a radius 52 and thence outwardly to the rib 51, this radius 52 increasing in dimension from the lesser radius at the rib 50 outwardly to the peripheral portion of the rotor 40. A rib 51 on one side of the rotor 40 is directly opposite from a rib 51 on the other side, and the outer ends of these two ribs 51 terminate in a transversely extending line 53. The rotor is formed to have a peripheral toothed shape by reason of the cell 47 on one side opposite from the cell 47 on the other side terminating in an area 54 which slopes at an acute angle inwardly of the rotor from the line 53 for a major distance across the cell 47 and thence through a radius 55 sharply around and outwardly to the next adjacent line 53. A cell 47 on one side of the rotor 40 is interconnected with the cell immediately opposite on the other side by an inter-communicating passageway designated by the numeral 56, this passageway entering the rotor immediately adjacent the zone 50 from an orifice 57, sloping from the cell wall, Fig. 16, substantially on a continued line of the radius 52 into the rotor, and thence at an angle approaching 90 degrees back along an extended line of the radius 52 of the opposite cell 47. In other words the passageway 56 in traversing the rotor from one cell to the other makes a bend within the rotor approaching 90 degrees. This passageway 56 is open at all times.

The two stator case members 43 and 44 which are joined together to form an over-all cavity within which the rotor 40 turns are exactly alike in size and shape as to their interior opposing wall shapes. The stator member 43, Fig. 5, is made in an upper half 43a and a lower half 43b for ease in assembly of the engine. For the purpose of description, the two halves 43a and 43b may be taken together as a single unit member. There are positioned circumferentially around the inner face 59 a plurality of radially extending cells 60 extending from an inner circumferential zone 61. These cells 60 are separated by a boundary, radially extending ribs 62 and 63 in each instance. These cells 60 in the stator member 43 have exactly the same dimensions as to depth and curvatures as do the cells 47 in the rotor 40.

The rotor 40 has, in the present form being described, twenty five cells 47 on each side, this number being of course variable depending upon the size of the engine to be built and therefore the number of cells thus selected in this description is not to be considered as any limitation. In the stator case member 43, where a fragment of the rotor 40 is superimposed upon the case member 43 and assuming that the rotor 40 is to turn in a counter-clockwise direction as viewed in Fig. 5, following the rib 62a there is a radially extending cavity 64 serving as an exhaust passageway leading from the circumferential rib 61 through an opening 65 in the member 43. A land 66 extends radially across the member 43 to the circumferential ring 61, lying in the plane of the ribs 62 and 63. The circumferential length of the outer end of this land 66 slightly exceeds the distance between the adjacent edges 53 of the rotor 40. The width of this exhaust passageway 64 combined with the width of the land 66 takes up that amount of space which leaves exactly twenty two cells 60.

Figure 9:
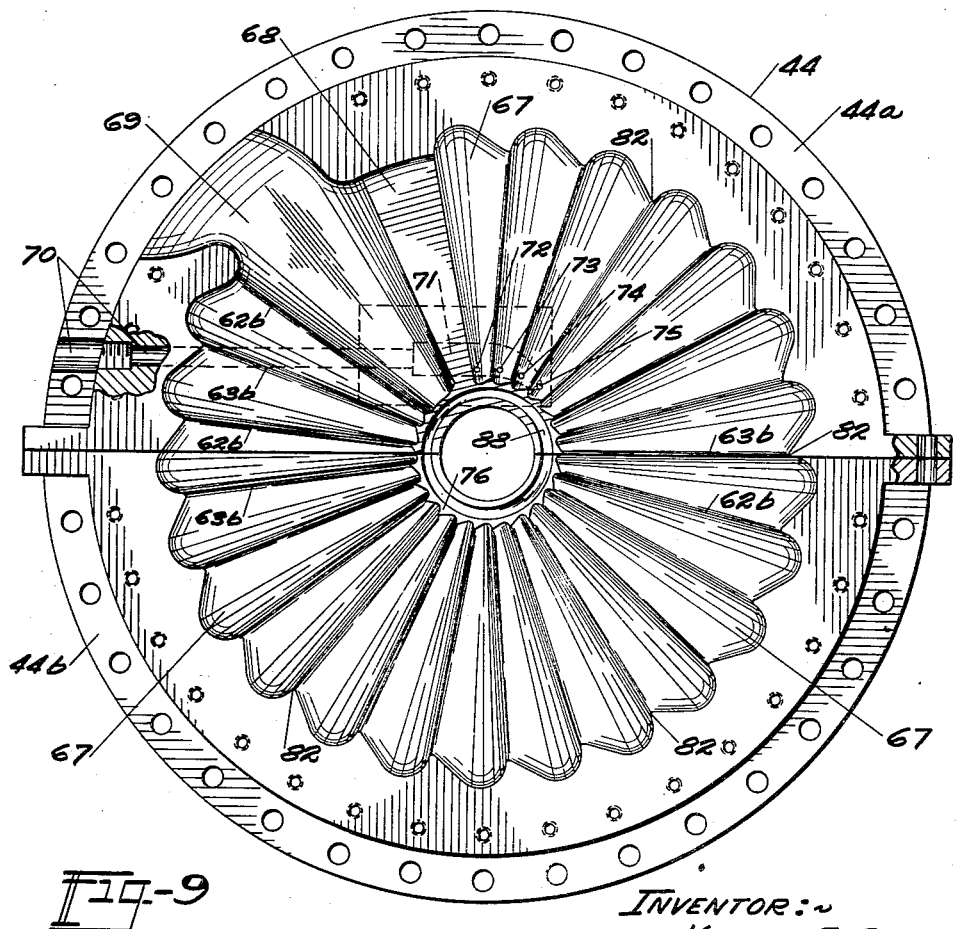
Fig. 9 is a view in inside elevation of the stator case, opposite from the side shown in Fig. 5.

The opposite stator case member 44, Fig. 9, is formed in exactly the same manner to match the configuration of the stator 43 as to the cells 67 in the member 44 and the cells 60 in the stator member 43. In this stator member 44, there is the land 68 corresponding to the land 66 and the exhaust passageway 69 corresponding to the exhaust passageway 64 in the companion stator member. This stator member 44 like the stator member 43 is made in an upper portion 44a and a lower portion 44b dividing on a horizontal plane, for the sake of assembly, but to all intents and purposes forming an integral unit in the final assembly.

There is a fluid (gaseous) inlet passageway 70 passing horizontally through the stator case member 44 and terminating interiorally thereof in a distributing head 71 from which there is directed one or more discharge passageways, herein shown as four in number 72, 73, 74, and 75. These passageways are adjacent the circumferential ring 76 at the inner radial ends of the cells 67, and open into those cells as indicated in Fig. 9. That is, these passageways open one after another in the consecutive cells spaced therearound in a clockwise manner from the land 68 as viewed in Fig. 9.

The stator case member 46 is an exact duplicate of the stator case member 44, one abutting the other face to face as indicated in Fig. 3. The only difference between the two case members 44 and 46 resides in the fact that in case member 46 the fluid intake pipe is below the center line instead of thereabove, this being illustrated in Figs. 1 and 4 where the intake fluid line 77 enters from the outer peripheral portion to communicate with the distributing head 78, as shown in Fig. 3.

Likewise the stator case member 45 is identical in all respects with the stator case member 43, and bolts against the outer face of the case member 46. It is to be noted that the stator case members 43 and 45 each carry an outboard bearing hub 79 and 80 through which the shaft 42 is revolubly carried. With the two rotors 40 and 41 mounted on the shaft 42, the upper halves of the various stator case members 43, 44, 46, and 45 are lowered in place to completely enclose the rotors 40 and 41 therewithin. The entire assembly thus far described is supported by a base 81. There is provided sealing means between the two rotors 40 and 41 and their respective enclosing stator case members 43, 44 and 46, 45. This sealing means is located circumferentially around and adjacent the shaft 42 in each instance.

The rotor ribs 51 and the stator ribs 62, 63 pass one another with a free running fit, and likewise the outer traverse lines 53 of the rotor pass the lines 82 transversely extending across the stator members 43 and 44, hereinafter referred to with a close running fit. That is, these various ribs and lines do not actually contact, but the clearance therebetween is held to be as close as possible without actually coming into contact.

The sealing means between the rotor and the stator case members is best illustrated in Figs. 17-28 where they are shown on an enlarged scale. The rotor 40 is fixed on the shaft 42 by any suitable means, herein shown as being secured thereto in driving relation by means of a key 83. The shaft 42 passes through both of the stator case elements, 43 and 44 on the one side and 45 and 46 on the other side with clearance as indicated so that there is no frictional engagement therebetween. The seal, used to prevent loss of operating fluid past the rotor 40 and along the shaft 42, consists of identical means on each side of the rotor 40, wherein there is a ring, continuous in nature, designated by the numeral 84, fixed within groove 88 of the stator case member 43 on the one side and 44 on the other side. This ring 84 is stepped to provide two different diameter surfaces, 85 the lesser diameter, and 86 the larger diameter, Figs. 20-22. A second one piece ring 87 slidably enters the above mentioned sealing groove 49 in the side face of the rotor 40, and is provided with a face 89 which is grooved to form a plurality of concentric, spaced apart ribs 90 terminating in a common plane and bearing against the bottom of the groove 49, Figs. 23-25. The ring 87 is stepped to have the internal major diameter portion 91 and a lesser internal diameter portion 92, the diameter portion 91 fitting over the diameter portion 86 of the ring 84 and the diameter portion 92 fitting over the diameter portion 85 of ring 84.

These two rings 84 and 87 are held in circumferential alignment by means of the two circumferential bands 93 and 94, band 93 entering respectively circumferential slots 95 in the ring 84 and 96 in the ring 87 while band 94 enters in the annular slots 97 in the ring 84 and 98 in the ring 87. In order to maintain the ribs 90 on face 89 in compressive engagement with the bottom of the groove 49, a spring band 99 is interposed between the rings 84 and 87. This band, Figs. 18 and 19, is a continuous member having an arcuate rib 100 centrally disposed from the annular ring portions 101 and 102. These portions 101 and 102 fit within slots 103 in the ring 87 and 104 in the ring 84, and the rib 100 is compressibly engaged by these abutting ring portions. In order to retain the ring 87 against travel with the rotor 40, the bands 93 and 94, Figs. 26–28, in each instance are provided with laterally extending pins 105, here shown as two in number, and entering sockets 106 in the rings at the bottoms of the respective grooves.

What fluid might escape axially along the shaft 42 past the packing means thus described is arrested by means of several stages of packing glands, herein shown as three in number and designated by the numeral 107 in each instance, there being three stages in each of the stator case members 43 and 45. Any fluid collecting around these stages is drained through the pipes 108 into the base chamber 109. A top housing 110 fits over the base 81 so that the external portion of the stator members 43, 44, and 45, 46 are completely enclosed between that housing 110 and the chamber 109. Exhaust coming from the passageway 64, 69 in each instance discharges within the housing 110 and thus communicates with the chamber 109, from which there is an exhaust opening 111.

Operation

Assuming that the operating fluid is steam under rather high pressure, the steam is admitted through two intake lines 70 and 77 from which the steam escapes through the passageways 72—75 into the first four cells 67 following the position leaving the lands 66 and 68. Steam escaping into these cells starts to expand since the cells expand in cross section from the openings 72—75 to the outer radial end portions thereof.

It is to be noted that, as best illustrated in Fig. 5, when the ribs 51 of the rotor cell 47 coincide with the ribs 62, 63 of the stator cell 60, there will be formed a combined steam receiving chamber between those ribs where one cell matches another cell, the cross section of which combined chamber is substantially elliptical at any radial distance outwardly from the central ribs 50 and 61. That is, the elliptical cross sectional area increases in area from the central portion of the rotor outwardly to its periphery. The steam admitted into these passageways, having the combined passageway when there is matching of the ribs and overlapping cellular spaces when the ribs are not matching, expands outwardly radially into the major cross sectional area portions of the cells, whereby the expansive effect of the steam against the radial portion of the cell in the stator case member is exerted toward the radial portion of the rotor cell in each instance tending to set up the rotative force. It is to be noted here specifically, that the radial side of each cell in the stator is on the opposite side of the cell as compared to the radial portion of the cell in the rotor. This is best indicated in Fig. 5. There may be a transmission of steam exhausting from the peripheral ends of the various cells into the space intermittently set up in a sinuous manner around the periphery of the rotor and the periphery of the transverse lines 82 across the radial end of ribs 62, 63 of the stator case member 43 in alignment with the ribs 62b and 63b of the stator case member 44. This sinuous passageway setup will exhaust into the combined passageway of the passages 64 and 69 and into the housing 110 and finally out to the exhaust opening 111 which may lead to a condenser. The lands 66 and 68 are so spaced apart as to allow the rotor to travel therebetween without any appreciable escape of the steam into the exhaust passageway. Any exhausting of the steam has to be around the peripheral portion of the rotor in the passage indicated, but due to that sinuous passageway, the travel therearound will be slight, so that the expansion of the steam is successively had between the rotor cells and the stator cells as the rotor turns, so that each cell may exhaust fully and completely into the combined passageways 64, 69 when the cell unloads in traveling thereacross.

Thus it is to be seen that in this form of the invention, steam is admitted into a plurality of initial cells, and allowed to expand around a major portion of each revolution of the rotor until the pressure reaches a much lower level by the time it is exhausted. The expansion is in two directions, namely radially and circumferentially.

The steam in entering from the one side of the rotor from the passageways 72—75 is in part transmitted directly through the rotor by traversing the passageways 56 so that there is substantially an equal amount of fluid on each side of the rotor, thereby eliminating end thrust on the shaft 42. Of course where the second rotor 41 is employed, that end thrust is further avoided by reason of the steam discharging in an opposite direction through the head 78 as compared to the direction of discharge from the head 71. The steam is preferably exhausted within the housing 110 and chamber 109 in order to maintain the stator temperature at a relatively constant value, and also at a desirable elevation so as to prevent heat loss by heat transfer through the stators.

Combined expansion and reaction type

In Figs. 29–33 there is shown a modified form of the rotor and stator elements which would be employed particularly when a high rate of acceleration of the rotor is desired as well as for increased power.

In this form, a rotor generally designated by the numeral 115 is employed to have the same shape of cells as has been shown and described in the rotor 40 for example. The cell in this modified form is generally designated by the numeral 116, but each of these cells 116 is closed off by a ring 117 extending entirely around the rotor so that there is no end exit from any of these cells 116. Around the periphery of the rotor 115, outside of the ring 117, are a plurality of blades 118 of the full width of the rotor. Each of these blades 118 has a trailing straight or planar area 120 inclined from the outer edge 119 toward the ring 117 where there is a radial curving area 114 turning around into the edge 119 of the next adjacent vane or blade 118, Fig. 29. These vanes or blades 118 are generally saw-tooth in form. It is to be understod that the cells 116 appear in opposite relation, on each of the sides of the rotor 115.

Each section or side of the stator 121, Fig. 32, has cells 122 formed therein of the same size and shape as the cells 116 on the rotor 115. And there is the initial land 123 following the exhaust passageway 124. These cells 122 are closed off at their outer radial ends 125. Beyond the circumferential lines 125, there extends an annular cavity 126 around the stator section 121, from which there extends outwardly the pockets 127 terminating by cross lines 128 in each instance. The rotor blade edges 119 travel around and across these lines 128 in close proximity. The pockets 127 are so formed as to have a radial end 129 from which the wall of the pocket slopes by a generally planar surface 130 to the next adjacent cross line 128 whereby there is set up the arcuate end 129 from which the steam may expand toward the arcuate side 114 of the rotor teeth 118 as they travel their path.

In order to take advantage of the rotor teeth 118, there are a plurality of jets 131, herein shown as three in number, Fig. 32, from which steam discharges into the initial pockets 127, herein shown as three in number, so that the jets are actually discharging steam directly toward the teeth 118 and tending to push them around in a clockwise direction as viewed in Fig. 32. This steam discharging from the jets 131 may be so regulated that it may be applied only when additional acceleration is required or when there is an unusually heavy load imposed upon the engine, or it may work simultaneously at all times along with the steam entering from distributing head 132 to the individual cells 122 toward their inner ends.

Thus in this modified form of the engine, the side cells on the rotor and on the stator case members are employed, and in addition thereto there is the peripheral jet action against peripheral teeth to be had.

Multi-radial cell type

The rotor 40 as illustrated and above described may be termed a single stage expansion rotor in view of the fact that each of the cells 47 are continuous, although widening from the rib 50 to the outer periphery. That is, in this term of single stage, there is meant to be conveyed the fact that the expansion is carried on in each of the individual cells 47.

That basic form of rotor 40 may be modified as shown in Figs. 34–36 to constitute a multi-stage rotor in that the steam upon initial admission will first expand through one set of cells, and before reaching the periphery of the rotor, will expand through a second set of cells, the second set of cells being numerically greater than the number of the initial cells which may be termed for the purpose of description as the primary cells while the multiple number of cells may be termed the secondary cells.

Referring to Figs. 34–36, the rotor 150 has a plurality of radially extending cells 151 on each side of the rotor extending in diverging manner from the rib 50 outwardly along the rotor 150 to terminate at a zone wherein the expansion of gaseous fluid may be utilized to the best advantage, and from those primary cells 151, the gaseous fluid or steam, as has been selected as the medium in the present description, may travel radially into the secondary cells 152 which extend from the zone generally designated by the numeral 153 to the periphery of the rotor, these cells 152 being open at the zone 153 and also open at the periphery. These primary cells 151 are defined by the radial lines 154 as ribs of the rotor 150, and the secondary cells 152 are defined by the radial extending lines 155, there being in the present instance twice as many cells 152 as there are cells 151. It is to be understood that this proportion of secondary cells to primary cells is given only for purposes of illustration, since the ratio therebetween as well as the lengths of the lines 154 and 155 may vary considerably depending upon the over-all design of the rotor for a given power output condition as may be required. In the present illustration, every third line 155 coincides with a line 154. Steam will be fed to both sides of the rotor 150 through the passageway 56. This passageway 56 will be adjacent or in close proximity to the rib 50 as in the previously described form.

In Figs. 37 and 38, there is illustrated a stator case member 156, in this instance corresponding to the stator case member 44. This member 156 will be made preferably in the upper section 156a and the lower section 156b, joined together along a horizontally disposed dividing plane to form in effect a single case member. On the face of the case member 156, there will be the initial primary cells 157 from which lead in each instance two secondary cells 158, the zone 159 between the two sets of cells corresponding to the zone 153 of the rotor, and the conformation of the cells and dimensions thereof will be the same as appear on the face of the rotor 150 with exception that the cross sectional contour of each of the cells 157, 158 will be exactly opposite to the contour of the cells 151 and 152. There will be the sealing land 160 and the steam discharge openings 72—75 of head 164 will appear one each in the four consecutive cells 157 following the land 160. At the other side of the land 160, there will be the exhaust passageway 161. The peripherial transverse lines 162 across the rotor 150 at the outermost terminal portions of the cells 152 will travel in very close proximity to the transverse lines 163 of the cells 158 formed in the stator case member 156, all as has been described in reference to the rotor 40.

There will of course be a companion case member matching the case member 156, and since it duplicates the same cellular construction as is shown in the case member 156, a drawing thereof is not herein presented.

The operation of the engine embodying that form of rotor 150 in a stator having a case member 156 and its companion will be that steam is entered through the orifices 72—75 and allowed to expand circumferentially as well as radially through the primary cells 157 as the first stage of expansion, and from those cells the steam may flow on radially through the cells 158 expanding circumferentially again as well as radially, all as the rotor 150 is revolving in a clockwise manner as would be viewed in relation to the case member 156 in Fig. 37. Thus the steam is not only expanding from the high pressure down to a low pressure at the outer peripheral portion of the rotor 150, but some of it may expand therebeyond into the pockets 166 formed in the stator beyond the lines 163 for a further reactive effect. It is to be understood that the steam will also be expanding in the stator cells 158 in like manner as it does along the rotor 150, the cells 157 of the stator case member and 151 of the rotor in each case forming in reality half cells while the secondary cells 152 of the rotor and 158 of the stator case member likewise each form half cells matching at intervals of time as the rotor passes the stator cells forming the combined cells during certain stages of the expansion of the steam. The steam of course will eventually escape from the rotor cells into the exhaust passageway 161 as cell after cell reaches that position.

Therefore, the invention in any one of the three forms may constitute an engine of very desirable characteristics and highly useful as a rotary type engine giving a maximum output for a minimum size of construction. The engine of course would be useful in any application wherein the engine output could be used from the rotary drive shaft 42.

While the engine has been defined in the three separate forms, it is to be understood that these forms may be combined in different arrangements such as by providing multiple secondary cells in engines employing the rotor of the type shown in Figs. 29–33 as peripheral blades or vanes 118. Also the secondary set of cells may be employed to supplant the outer end portions of the cells 116 of the same rotor 115. Therefore I do not desire to be limited to the precise forms as illustrated and described herein since it is obvious that structural variations may be employed without departing from the spirit of the invention, and I therefore do not desire to be limited to those precise forms beyond the limitations which may be imposed by the following claims.

I claim:

1. A rotary engine operable by a gaseous fluid comprising a rotor turning on a central axis; a plurality of circumferentially spaced apart ribs extending continuously radially across a side face of the rotor from its axial zone to a peripheral portion thereof; said rotor having a half-cell entering said rotor side between and throughout the lengths of adjacent ribs increasing in circumferential width from said zone to said peripheral portion; a stator having a face presented toward said ribs and across which stator face said rotor coaxially turns; a plurality of ribs circumferentially spaced apart and extending continuously from a central zone radially outwardly as a part of said face to a peripheral portion of the stator; said stator having a half-cell entering its face between and throughout the lengths of adjacent ribs thereof increasing in circumferential width from said stator zone to said stator peripheral portion; ribs of the rotor coinciding with their intervening half-cells in consecutive matching relation over said stator ribs and half-cells in rotated positions of the rotor; said matching relation defining cells completed from said half-cells wherein the completed cells in cross-section at any radial locations thereof have an approximate elliptical shape with the major axis of the ellipse being directed diagonally from the stator across the rotor in the general direction of rotation of the rotor; means inducting said gaseous fluid into said rotor half-cells in the axial zones thereof; said stator having an exhaust passageway leading to and from said peripheral portion from between a pair of adjacent stator ribs.

2. The structure of claim 1 in which there is a land constituting a part of said stator face and in the plane of the stator ribs extending radially from said axial zone in increasing circumferential width to said stator peripheral portion, the width of said land being equal to at least the width of one of said stator half-cells; and said exhaust passageway being on that side of said land toward which said rotor turns.

3. The structure of claim 1 in which said rotor has a second face in which there are half-cells between ribs corresponding in size and shape and are opposite to those in the first rotor side face; a stator second face exposed toward said rotor second face, the stator second face having half-cells corresponding in size and shape to those of the other stator face; blades extending radially from and transversely across said rotor peripheral portion; said stator having a plurality of transverse fluid expansion passageways located radially beyond and across said blades.

4. The structure of claim 3 in which said rotor half-cells have closed peripheral ends; said blades have side faces approximately within the planes defined by said rotor ribs; said stator half-cells having closed peripheral ends; and means introducing said gaseous fluid also into selected stator transverse passageways; said blades traversing said exhaust passageway.

5. The structure of claim 3 in which the opposite half-cells of said rotor on each side thereof terminate on common rotor peripheral ends reentering the rotor between said blades and said fluid may expand from said completed cells past said common rotor ends into said stator transverse passageways.

6. A rotary engine operable by a gaseous fluid comprising a rotor turning on a central axis; a plurality of circumferentially spaced apart ribs extending continuously radially across a side face of the rotor from its axial zone to a peripheral portion thereof; said rotor having a half-cell entering said rotor side between and throughout the lengths of adjacent ribs increasing in circumferential width from said zone to said peripheral portion; a stator having a face presented toward said ribs and across which stator face said rotor coaxially turns; a plurality of ribs circumferentially spaced apart and extending continuously from a central zone radially outwardly as a part of said face to a peripheral portion of the stator; said stator having a half-cell entering its face between and throughout the lenths of adjacent ribs thereof increasing in circumferential width from said stator zone to said stator peripheral portion; ribs of the rotor coinciding with their intervening half-cells in consecutive matching relation over said stator ribs and half-cells in rotated positions of the rotor; said matching relation defining cells completed from said half-cells wherein the completed cells in cross-section at any radial locations thereof have an approximate elliptical shape with the major axis of the ellipse being directed diagonally from the stator across the rotor in the general direction of rotation of the rotor; means inducting said gaseous fluid into said rotor half-cells in the axial zones thereof; said stator having an exhaust passageway leading to and from said peripheral portion from between a pair of adjacent stator ribs; a second side face on said rotor; radial ribs of said second face and half-cells between the ribs entering said second face between its ribs corresponding in size and shape to the ribs and half-cells of said first face, the half-cells of one face being opposite those of the second face; a stator second face exposed toward said rotor second face and having half-cells entering therein corresponding in size and shape to those of the first stator face; said rotor half-cells in both rotor faces having closed peripheral ends; blades extending radially from and transversely acros the peripheral portion of said rotor beyond said closed cell ends; said stator having an angular cavity radially beyond its said half-cell closed ends and through which cavity said blades travel; said stator having a plurality of pockets opening into said cavity and extending outwardly therefrom; and means directing supplementary gaseous fluid into a selected number of said pockets for expansion therefrom in a driving direction against said blades.

7. A rotary engine operable by a gaseous fluid comprising a rotor turning on a central axis; a plurality of circumferentially spaced apart ribs extending continuously radially across a side face of the rotor from its axial zone to a peripheral portion thereof; said rotor having a half-cell entering said rotor side between and throughout the lengths of adjacent ribs increasing in circumferential width from said zone to said peripheral portion; a stator having a face presented toward said ribs and across which stator face said rotor coaxially turns; a plurality of ribs circumferentially spaced apart and extending continuously from a central zone radially outwardly as a part of said face to a peripheral portion of the stator; said stator having a half-cell entering its face between and throughout the lengths of adjacent ribs thereof increasing in circumferential width from said stator zone to said stator peripheral portion; ribs of the rotor coinciding with their intervening half-cells in consecutive matching relation over said stator ribs and half-cells in rotated positions of the rotor; said matching relation defining cells completed from said half-cells wherein the completed cells in cross-section at any radial locations thereof have an approximate elliptical shape with the major axis of the ellipse being directed diagonally from the stator across the rotor in the general direction of rotation of the rotor; means inducting said gaseous fluid into said rotor half-cells in the axial zones thereof; said stator having an exhaust passageway leading to and from said peripheral portion from between a pair of adjacent stator ribs; said rotor side face having a plurality of additional half-cells between said rotor ribs confined between said rotor ribs and extending in length continuously from a circumferential zone intermediate said rotor axial zone to said peripheral portion of the rotor; said additional half-cells being defined between a radial rib extending from said intermediate zone to said portion and disposed in spaced relation between adjacent ones of said first rotor ribs; said stator face likewise having supplementary half-cells opening therefrom in location and size to complement said rotor supplementary half-cells.

8. The structure of claim 7 in which said rotor and stator complementary cells open by their outer ends through said rotor peripheral portion; a blade at ends of said first and said second rotor ribs and said stator having pockets therearound opening toward said blade.

References Cited in the file of this patent

UNITED STATES PATENTS 2,417,600   Jutte _____ Mar. 18, 1947